US011715384B2

(12) United States Patent
    Chakraborti

(10) Patent No.: US 11,715,384 B2
(45) Date of Patent: Aug. 1, 2023

(54) AUTOMATED PERSONALIZATION OF A USER EXPERIENCE

(71) Applicant: International Business Machines Corporation, Armonk, NY (US)

(72) Inventor: Tathagata Chakraborti, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 17/336,688

(22) Filed: Jun. 2, 2021

(65) Prior Publication Data

US 2022/0392366 A1     Dec. 8, 2022

(51) Int. Cl.
    *G09B 5/00*     (2006.01)
    *G09B 5/06*     (2006.01)
    *G09B 5/08*     (2006.01)

(52) U.S. Cl.
    CPC ............... *G09B 5/067* (2013.01); *G09B 5/08* (2013.01)

(58) Field of Classification Search
    CPC .................................. G09B 5/08; G09B 5/067
    See application file for complete search history.

(56) References Cited

U.S. PATENT DOCUMENTS

| | | | |
|---|---|---|---|
| 6,480,191 B1 | 11/2002 | Balabanovic | |
| 8,298,059 B2 | 10/2012 | Ivory | |
| 9,753,703 B2* | 9/2017 | Jemiolo | ..................... G06F 8/38 |
| 9,950,264 B2 | 4/2018 | Hain | |
| 10,424,220 B2 | 9/2019 | Huet | |
| 10,762,292 B2 | 9/2020 | Jemiolo | |
| 10,818,058 B1* | 10/2020 | Gupta | ................... G11B 27/031 |
| 2014/0149496 A1* | 5/2014 | Lee | ........................... G09B 5/00 709/203 |
| 2014/0342336 A1 | 11/2014 | Kapoor | |
| 2015/0339942 A1* | 11/2015 | Ben-Naim | ............. G06Q 10/10 434/309 |
| 2017/0109393 A1 | 4/2017 | Jemiolo | |
| 2017/0139656 A1 | 5/2017 | Sterling | |
| 2019/0096280 A1 | 3/2019 | Saunders | |

(Continued)

OTHER PUBLICATIONS

Blomkvist et al., "Low Threshold Service Design: Desktop Walkthrough", 2016 Fifth Service Design and Innovation Conference, 13 pages.

(Continued)

*Primary Examiner* — Justin S Lee
(74) *Attorney, Agent, or Firm* — Brian M. Restauro

(57) ABSTRACT

Embodiments of the present invention provide a computer system a computer program product, and a computer implemented method. Embodiments of the present invention can identify at least one user in a plurality of users using a plurality of indicative markers. Embodiments of the present invention can then dynamically analyze input data stored on a computing device associated with the identified user and generate an automated personalized walkthrough by tailoring a plurality of steps within the input data to the at least one identified user. Certain embodiments of the present invention can then, in response to generating the automated personalized walkthrough, generate an automated personalized tutorial by aggregating the generated walkthrough and the at least one identified user based on a predetermined threshold of assessment.

20 Claims, 3 Drawing Sheets

(56) References Cited

U.S. PATENT DOCUMENTS

| | | |
|---|---|---|
| 2019/0287197 A1 | 9/2019 | Chang |
| 2020/0082586 A1* | 3/2020 | Jindal .................... G06F 9/453 |
| 2020/0143299 A1 | 5/2020 | Sridhara |
| 2020/0322917 A1 | 10/2020 | Rosenberg |
| 2022/0076173 A1* | 3/2022 | Anyaoha ............. G06Q 10/025 |

OTHER PUBLICATIONS

Chakraborti et al., "Plan explanations as Model Reconciliation: Moving beyond Explanation as Soliloquy", Proceedings of the Twenty-Sixth International Joint Conference on Artificial Intelligence (IJCAI-17), 8 pages.

Green et al., "Using The Cognitive Walkthrough To Improve The Design Of A Visual Programming Experiment", Downloaded Jan. 4, 2021, 8 pages.

Grover et al., "What can Automated Planning do for Intelligent Tutoring Systems?", Downloaded Jan. 4, 2021, 10 pages.

Kafer et al., "What Is The Best Way For Developers To Learn New Software Tools?", Published Apr. 1, 2017, 41 pages, <https://doi.org/10.22152/programming-journal.org/2017/1/17>.

Light et al., "The Walkthrough Method : An Approach To The Study of Apps", Published Date 2018, 27 pages.

Polgar, Peter, Balazs, "Using The Cognitive Walkthrough Method In Software Process Improvement", e-Informatica Software Engineering Journal, vol. 9, Issue 1, 2015, DOI 10.5277/e-Inf150105, 7 pages.

* cited by examiner

AUTOMATED PERSONALIZATION OF A USER EXPERIENCE

BACKGROUND

The present invention relates generally to the field of data automation technology, and more specifically automated personalization of walkthroughs and tutorials.

Data automation is the process of updating data on an open data portal programmatically, rather than manually. Automating the process of data uploading is important for the long-term sustainability of your open data program. Any data that is updated manually risks being delayed because it is one more task an individual has to do as part of their workload.

A computer tutorial is an interactive software program created as a learning tool. Tutorials help individuals learn new skills by using a step-by-step process that ensures the individual is following along and comprehending the material. A tutorial is a method of transferring knowledge and may be used as a part of a learning process. More interactive and specific than a book or lecture, a tutorial seeks to teach by example and supply the information to complete a certain task. A tutorial can be taken in many forms, ranging from a set of instructions to complete a task to an interactive problem solving session.

SUMMARY

Embodiments of the present invention provide a computer system a computer program product, and a method that identifying at least one user in a plurality of users using a plurality of indicative markers; dynamically analyzing input data stored on a computing device associated with the identified user; generating an automated personalized walkthrough by tailoring a plurality of steps within the input data to the at least one identified user; and in response to generating the automated personalized walkthrough, generating an automated personalized tutorial by aggregating the generated walkthrough and the at least one identified user based on a predetermined threshold of assessment.

DETAILED DESCRIPTION

Figure 1:
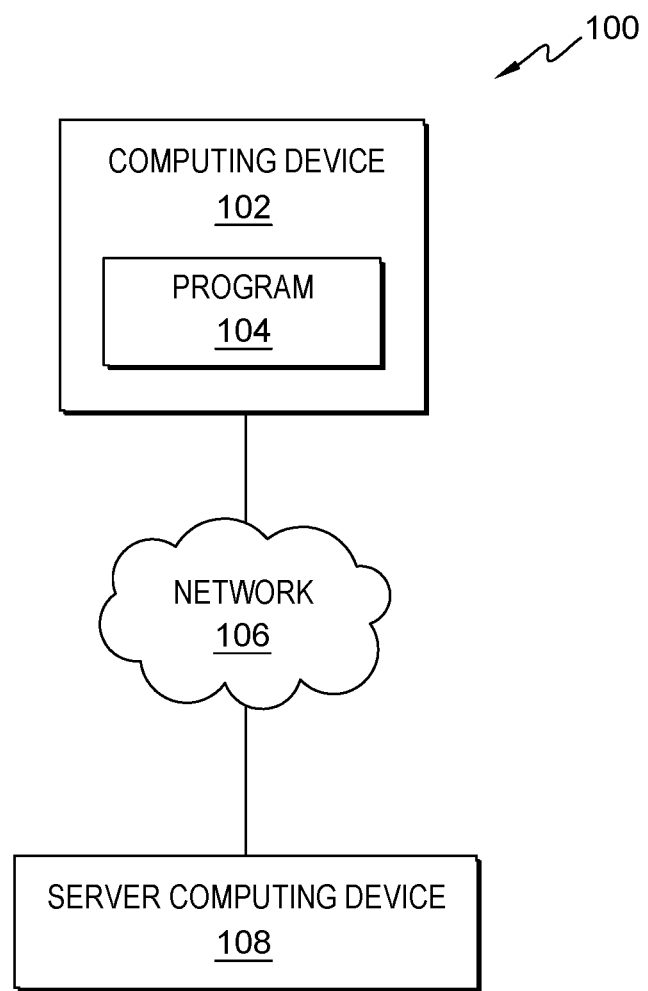
FIG. 1 is a functional block diagram depicting an environment with a computing device connected to or in communication with another computing device, in accordance with at least one embodiment of the present invention.

Embodiments of the present invention recognize the need for minimizing an information overload of current data walkthrough technology and maximizing a knowledge transfer associated with the current data walkthrough technology. Current data walkthrough technology generally requires an overload of irrelevant information that increases the effort needed by the computing device. In some instances, current data walkthrough technology can be perceived as a detailed tutorial jungle that does not provide an efficient step-by-step process while other walkthrough technology is known to simply talk an individual through a plurality of features and download a plurality of updates that are irrelevant and unhelpful for the user. Regardless of the current deficiencies of walkthrough technology, the process for creating walkthroughs and tutorials can be time consuming and inefficient due to manual construction of these tutorials.

Embodiments of the present invention recognize the problems described above and provide solutions for creating efficient, personalized walkthroughs and personalized tutorials for respective individuals. In this manner, as described in greater detail later in this Specification, embodiments of the present invention can minimize information overload and maximize knowledge transfer. For example, embodiments of the present invention minimize the information overload associated with current data walkthrough technology by explaining why certain steps were taken for deployment of a flask application to Kubernetes. In another example, embodiments of the present invention can maximize knowledge transfer by generating a sequence of tasks to cover relevant features of Kubernetes. In some embodiments, the automated personalized walkthrough can be an automated personalized tutorial for a plurality of users. Embodiments of the present invention maximize the knowledge transfer by generating an automated personalized tutorial and aggregating the automated personalized tutorial to the automated personalized walkthrough.

Certain other embodiments of the present invention can generate the automated personalized walkthrough for specific software features in response to a computing device downloading a new installation or a new update. Embodiments of the present invention increase the usefulness of the current data walkthrough technology by personalizing the walkthrough and tutorial content to user intent based on the profile of the user. Embodiments of the present invention improve the uniqueness of the current data walkthrough technology by analyzing a data profile associated with the user. In this embodiment, the data profile is defined as a conversion of data between multiple data sources to be used as input. For example, the data profile is an explanation of the thought process between a representation of the surrounding world and an intuitive perception of an individual.

Specifically, input data stored on a computing device associated with an identified user is used to estimate the difference between a functional model of the system and the user model and then reconcile those differences in the form of the tutorials and/or walkthroughs. Since the user model here is a copy of the functional system model, this is used as a generative model of how the user will use the system, that is, given the model and task the program 104 can generate the steps to do the task in that model. In this manner, the program 104 can use the model difference between the estimated user model and the functional system model and subsequently the generative model of the system together provides users the minimized tutorials. Specifically, each tutorial within the minimizes set of tutorials cover a particular set of model differences and together they cover the whole set of differences. Embodiments of the present invention using the methods described below allows users to minimize the size of those sets.

For example, in map applications, the system model is the map itself, that is, it is functional/generative. The program 104 can use the map to generate paths between any source and destination which is the function of the map. In this embodiment, the estimated user model refers to what the program 104 estimates what the user knows about the map. In some embodiments, the estimated user model can be a copy or version of the same map. This estimation is also generative since the program 104 knows exactly how the person will behave in their version of the map. In this embodiment, the tutorial represents the set of differences between the user's map and the systems map with each walkthrough or tutorial being a set of these differences and all the tutorials taken together reconcile the maps completely. Since the model is generative, the program 104 can guarantee that those sets of differences can be covered with minimal cost. For example, each task would be "going from a to b" and in, say, ten such journeys, the user would have covered all their misconceptions of the map. In this example, there could have been 15 such journeys that do accomplish the same task, but using the methods described below, the program 104 can minimize the number of such partitions and cost of each partition by using the fact that the program 104 can leverage the system model to generate behavior in each hypothesized partition.

In another example, using Kubernetes and a new user to Kubernetes, the program 104 can optimize partitions that minimize overlaps and cover missing or wrong concepts. Specifically, if the user is new to Kubernetes, the estimated user model is empty while the functional model of the software discloses how things work in the Kubernetes domain. In this example, the two partitions of the model differences are 1) run docker containers and 2) deploying them. The program 104 can generate two tutorials that cover the entire set of differences between user model and system model. In other embodiments, the program 104 recognizes that there are other ways of breaking up the differences but the two here ensure that they contain the least steps individually and overall to cover all the sets. For example, one tutorial could break apart the differences into four tutorials instead: 1) "learn to build docker" 2) "learn to generate the kubernetes yaml file" and 3) "learn to deploy" and 4) "learn to run a docker file? in which case taken together they would have amounted to more steps than the partition of two would. The above-described example showcases that there is some overlap of steps in the partition of two (e.g., docker build). Since the functional model is generative, the program 104 can optimize this to make partitions that minimize such overlaps and cover all missing or wrong concepts when the system model is compared to the estimated user model in the minimum number of steps.

FIG. 1 is a functional block diagram of a computing environment 100 in accordance with an embodiment of the present invention. The computing environment 100 includes a computing device 102 and a server computer 108. The computing device 102 and the server computer 108 may be desktop computers, laptop computers, specialized computer servers, smart phones, wearable technology, or any other computing devices known in the art. In certain embodiments, the computing device 102 and the server computer 108 may represent computing devices utilizing multiple computers or components to act as a single pool of seamless resources when accessed through a network 106. Generally, the computing device 102 and the server computer 108 may be representative of any electronic devices, or a combination of electronic devices, capable of executing machine-readable program instructions, as described in greater detail with regard to FIG. 3.

The computing device 102 may include a program 104. The program 104 may be a stand-alone program 104 on the computing device. In another embodiment, the program 104 may be stored on a server computer 108. In this embodiment, the program 104 improves the current walkthrough software by generating a user experience for a user interface that increases user information retention and improves practical application of the installed application. In this embodiment, the program 104 improves current walkthrough software by minimizing an information overload via generating an automated personalized walkthrough for a user. In this embodiment, the program 104 improves current walkthrough software by maximizing a knowledge transfer via generating an automated personalized tutorial for the user. In this embodiment, the program 104 generates the automated personalized walkthrough for the user by tailoring a plurality of steps within input data for the identity of the user based on an analysis of the input data and a data profile of the user. In this embodiment, the program 104 generates the automated personalized tutorial for the user by generating a plurality of tasks, where each task is required to be completed prior to a subsequent step becoming available, associated with the generated personalized walkthrough for the user. In this embodiment, the program 104 improves current walkthrough software by identifying an identity of a user; analyzing input data; generating a user experience for a user interface. In another embodiment, the program 104 generates an automated personalized walkthrough for the user. In another embodiment, the program 104 generates an automated personalized tutorial for the user. In another embodiment, the program 104 generates the automated personalized tutorial for the user using the generated walkthrough for the user.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computer 108, specifically the program 104 in accordance with a desired embodiment of the invention.

The server computer 108 communicates with the computing device 102 via the network 106. In this embodiment, the server computer 108 stores the dynamically selected data points of the prioritized data of the program 104 (not shown). In another embodiment, the server computer 108 may include the program 104.

Figure 2:
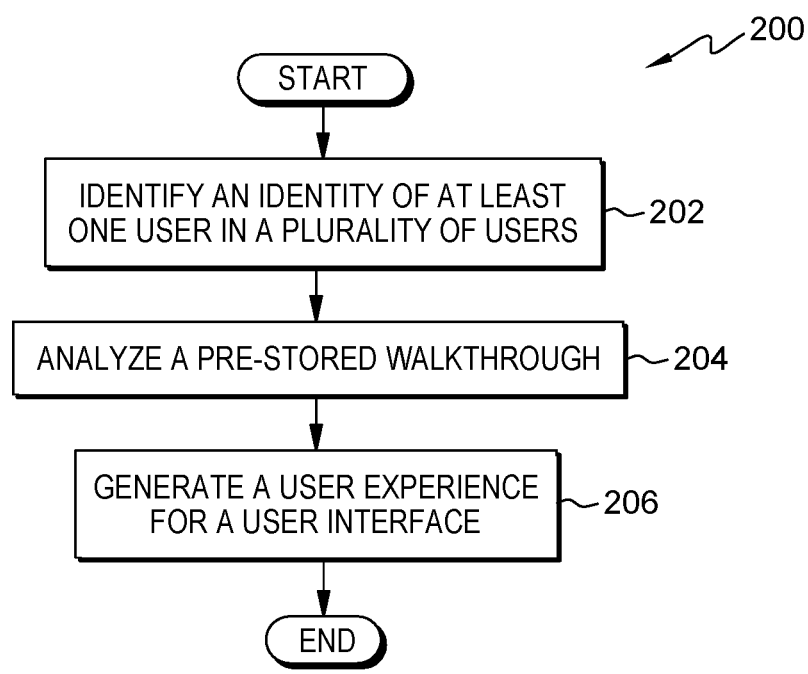
FIG. 2 is a flowchart illustrating operational steps for dynamically generating an automated personalized tutorial based on a generated walkthrough for a plurality of users, in accordance with at least one embodiment of the present invention.

FIG. 2 is a flowchart 200 illustrating operational steps for generating an automated personalized walkthrough for a plurality of users, in accordance with at least one embodiment of the present invention.

In step 202, the program 104 identifies at least one user in a plurality of users. In this embodiment, the program 104 identifies the least one user in the plurality of users by analyzing a plurality of indicative markers associated with an identity of the user and retrieving a data profile associated with the user based on the analysis of the plurality of indicative markers using an artificial correlation algorithm. In this embodiment, the program 104 defines indicative markers as any feature that can be associated with the identity of a user. In this embodiment, the program 104 defines a data profile associated with the user based on the background, biography, and preferences of the user. For example, the program 104 identifies the identity of user A based on a login username and password associated with user A that is used to log into the computing device 102. In this embodiment, the program 104 classifies technology associated with the user and an application competency based on the identify and data profile associated with the user. In another example, the program 104 identifies user B based on an audio request of user B using a voice recognition algorithm. In another embodiment, the program 104 identifies a user by identifying a login data of the user, a data tag of the computing device 102 associated with the user, a cluster number of the computing device 102 associated with the user. For example, the program 104 identifies user B based on a classified competency in an area of expertise (i.e., computer engineering) and identifies user A based on a classified competency in a different area of expertise (i.e., blockchain).

In step 204, the program 104 analyzes input data. As used herein, "input data" refers be any received media pertaining to a topic (e.g., knowledge area) or object (e.g., physical product). For example, in some embodiments, input data can be a text file containing patch notes. In other embodiments, input data a user manual for a product or service. In yet other embodiments, input data can be a media file containing at least one of audio, video, and text. For example, in some embodiments, input data can be a uniform resource link (URL) that leads to media (e.g., a video hosting platform that contains media describing a particular feature of a service). In another example, where input data references an application yet to be deployed, the program 104 can utilize any accompanying files of the application as input data to create a personalized walkthrough or tutorial. In yet other embodiments, input data can be a pre-stored walkthrough (e.g., an existing file or media. In general, input data can data pertaining to a topic of interest to the user. For example, in some cases, input data can be a fundamental model of software that a user requests help with or is otherwise interested in.

In this embodiment, the program 104 analyzes input data using a combination of natural language processing and natural language classification techniques (e.g., sentence splitting, tokenization, POS tagging, chunking, dependency parsing, and anaphora resolution, etc.) to process the semantics of the text. For example, in response to receiving instructions to install a new application or update a previously installed application, the program 104 can access accompanying text files to identify patch notes and process contents regarding patch notes. In other embodiments, the program 104 can access or otherwise query a database to identify other relevant input data (e.g., pre-stored walkthroughs, tutorials, etc.).

In this embodiment, the program 104 initiates in response to detecting an installation of a new application or an update to a previously installed application. In this embodiment and in response to installing a new application on the computing device, a pre-stored walkthrough accompanies the installation of the new application, thus the walkthrough is stored on the computing device whether it is a new application or an update of a previous application. In this embodiment and in response to a walkthrough not accompanying the installation of the application, the program 104 retrieves a walkthrough associated with the instillation of the application from an external data source. In this embodiment and in response to retrieving the walkthrough associated with the application from an external data source, the program 104 validates the retrieved walkthrough by identifying each step of the retrieved walkthrough, predicting a usefulness of each step in relation to the data profile of the identified user, wherein each step meets or exceeds a predetermined threshold of usefulness, and removing each step of the retrieved walkthrough that fails to meet the predetermined threshold of usefulness. In this embodiment, the program 104 defines usefulness as a quantitative value associated with a usage for a specific function needed for the operation of the installed application, such as predicting chemical reactions by selecting a sequence of chemical structures. For example, the data profile associated with the user displays a high affinity for chemistry, and the program 104 removes any step within walkthrough of the installation of a chemical identification application that the user would need no explanation to understand. In this embodiment, the program 104 defines the walkthrough as the plurality of steps associated with the installation of a newly downloaded application for the computing device 102 or an update for a previously downloaded application stored on the computing device 102. For example, the program 104 analyzes the input data associated with the installation of a Kubernetes application, where the walkthrough displays a sequence of pages that explain in detail the operation of the installed application. In this example, the program 104 displays each step within the walkthrough as an interactive page that presents information associated with the installation of the application; and in response to displaying all information provided for a step, a completion tab is displayed, wherein the completion tap automatically brings the user to a page displaying the subsequent step within the walkthrough. In another embodiment and in response to failing to determine the existence of a input data, the program 104 observes the user proceed through the walkthrough associated with the installation of the new application and stores each step of the walkthrough for future reference.

In step 206, the program 104 generates a user experience for a user interface. In this embodiment, the program 104 generates a user experience based, at least in part on the analyzed input data and characteristics of the user. For example, the program 104 can input data as one or more lines of code that, when deploys to Kubernetes. Portions of the received code could look like:
  bb: domain login
  bb: docker build -t app:v1.
  bb: domain cr login
  bb: docker tag app:v1 us.icr.io/ltl_images/app:v1
  bb: docker push us.icr.io/ltl_images/app:v1
  bb: domain ks cluster-config bashbot|grep -e "export"|echo
  bb: kubectl apply -f app.yaml Continuing the example, the program 104 could further identify that the user is not familiar with Kubernetes. As such, the program 104 could generate the following walkthrough to be displayed to the user:
  Deploy requires domain login, host and local ports, docker build and push, docker push must be with domain image tag, and cluster number In another example, the program 104 could receive input data specifying a specific function to be performed by an application (e.g., run Dockerfile). Specifically, the command line could resemble the following:
  bb: docker build -t app:v1.
  bb: docker run -i -p 8888:8888 -d app:v1

In this example, the program 104 has further identified that the user is unfamiliar with the command lines. As such, the program 104 can generate the following walkthrough for the user:
  Docker run requires an image to be built'building requires tag and version number→run requires host and local ports In some embodiments, the program 104 generates an automatically personalized user experience for a graphic user interface within the computing device 102. In this embodiment, the program 104 generates the user experience by analyzing the retrieved walkthrough and the identity of the user and automatically personalizing a user experience for the graphic user interface based on the analysis of the retrieved walkthrough and the identity of the user. In this embodiment, the program 104 defines the user experience as a display of data that responds to user input. For example, the program 104 generates an application software set-up as a graphic user interface with the computing device 102 that displays information associated with the installation of the application and responds to user input within the graphic user interface.

In another embodiment, the program 104 generates an automated personalized walkthrough as the user experience. In this embodiment and in response to analyzing the input data, the program 104 generates an automated personalized walkthrough for the user in a plurality of users based on the identity of the user. In this embodiment, the program 104 generates the automated personalized walkthrough by tailoring the plurality of steps within the input data for the identity of the user based on the analysis of the input data and the data profile associated with the user. In this embodiment, the program 104 defines the walkthrough as a step-by-step data display that provides information associated with the instillation of the application. For example, the program 104 generates a sequenced step interface that assists the user in the installation of a downloaded application. In this embodiment, the program 104 tailors the plurality of steps within the walkthrough by removing any step that fails to meet the predetermined threshold of usefulness associated with the analyzed walkthrough. For example, the personalized walkthrough of user A displays all the steps, steps one through ten, of the analyzed walkthrough; but the personalized walkthrough of user B, who has an extensive blockchain background noted in the data profile associated with user B, removes the steps of the walkthrough associated with blockchain. In this embodiment, the program 104 minimizes the information overload associated with the input data by generating the automated personalized walkthrough. In this embodiment, the program 104 defines the personalized walkthrough as automated based on the program 104 automatically completing a plurality of sections within the walkthrough based on the analysis of the input data. In this embodiment, the program 104 defines the automated walkthrough as personalized based on the program 104 tailoring the walkthrough to the identified identity associated with the user. For example, the program 104 generates an automated personalized walkthrough that removes a plurality of steps that fail to meet the predetermined threshold of usefulness for user A within the flask application associated with Kubernetes.

In another embodiment, the program 104 generates an automated personalized tutorial as the user experience. In this embodiment and in response to generating the automated personalized walkthrough, the program 104 generates an automated personalized tutorial for the plurality of users. In this embodiment, the program 104 defines tutorial as a dynamic learning educational tool that provides operational information on a plurality of features associated with the installation of the application. In this embodiment, the program 104 generates the automated personalized tutorial from the modified walkthrough based on the data profile associated with the user and the removal of steps that failed to meet the predetermined threshold of usefulness. In this embodiment, the program 104 generates the automated personalized tutorial using the generated personalized walkthrough as an initial input, wherein the generated personalized tutorial becomes the output. In this embodiment, the program 104 dynamically generates the automated personalized tutorial by generating a plurality of tasks, where each task is required to be completed prior to a subsequent step becoming available, associated with the generated walkthrough. In this embodiment, the program 104 defines task as an action (i.e., reading a section, watching a video, answering questions, or clicking a tabulation) that indicates that the user understands the information associated with the operation of the installed application. In this embodiment, the program 104 maximizes a knowledge transfer of the generated walkthrough by aggregating the generated walkthrough to the dynamically automated personalized tutorial.

In another embodiment, the program 104 generates the personalized tutorial as the user experience for the graphic user interface without using the generated walkthrough. In this embodiment, the program 104 generates the personalized tutorial by generating a user experience that provides a plurality of type of data to assist with the operation of the installed application. For example, the program 104 generates an educational tool that uses visual data and audio data within the graphic user interface that teaches the user the functions of the installed application.

In this embodiment, the program 104 aggregates the automated personalized tutorial to the generated walkthrough by performing a query on an external data source for an average assessment value associated with each step within the plurality of steps for the generated walkthrough; determines the steps associated with the generated walkthrough that the program 104 predicts that the user meets or exceeds a predetermined threshold of assessment based on the data profile of the user; prioritizes a sequence of determined steps within the generated walkthrough that were not removed, where the program 104 provides additional resources to the generated tutorial for the steps that are determined to be a higher prioritization than the steps that are determined to have a lower prioritization; and dynamically generates the automated personalized tutorial for the determined prioritized steps, wherein these determined steps require additional tasks and resources for optimal understanding. In this embodiment, the program 104 defines the assessment value as a value that is based on the average length of time a user takes to complete a task within the generated walkthrough, where the assessment value is on a scale of one to ten. In this embodiment, the program 104 determines that the assessment value of the steps that failed to meet the predetermined threshold of assessment based on the analysis of the input data and the identified data profile associated with the user. For example, the program 104 generates a sequence of tasks to cover the features of the flask application associated with Kubernetes in response to user A failing to meet the predetermined threshold of assessment regarding the features of the flask application.

In another embodiment, the program 104 displays the generated personalized tutorial on a graphic user interface that allows for user interaction. In this embodiment, the program 104 displays the generated personalized tutorial on the graphic user interface by transmitting the generated personalized tutorial for the user to the graphic user interface located on the computing device 102. In another embodiment and in response to displaying the generated personalized tutorial on the graphic user interface, the program 104 stores the generated personalized tutorial in the server computing device 108 for future use. In this embodiment, the program 104 can transmit the generated personalized tutorial on a traditional graphic user interface to be displayed on a screen of a device associated with a user. In other embodiments however, the program 104 can display the generated personalized tutorial on an augmented reality or virtual reality interface.

In other embodiments, the program 104 may not need a graphic user interface. For example, the program 104 may be initiated by a developer prior to deployment of an application. In those scenarios, the program 104 may use any accompanying files of the application available to the program 104, prior to release, to create a personalized walkthrough or a tutorial. Continuing this example, the program 104 can then choose to store the generated personalized tutorial or walkthrough on a database until such time the application is deployed or otherwise requested by a user.

Figure 3:
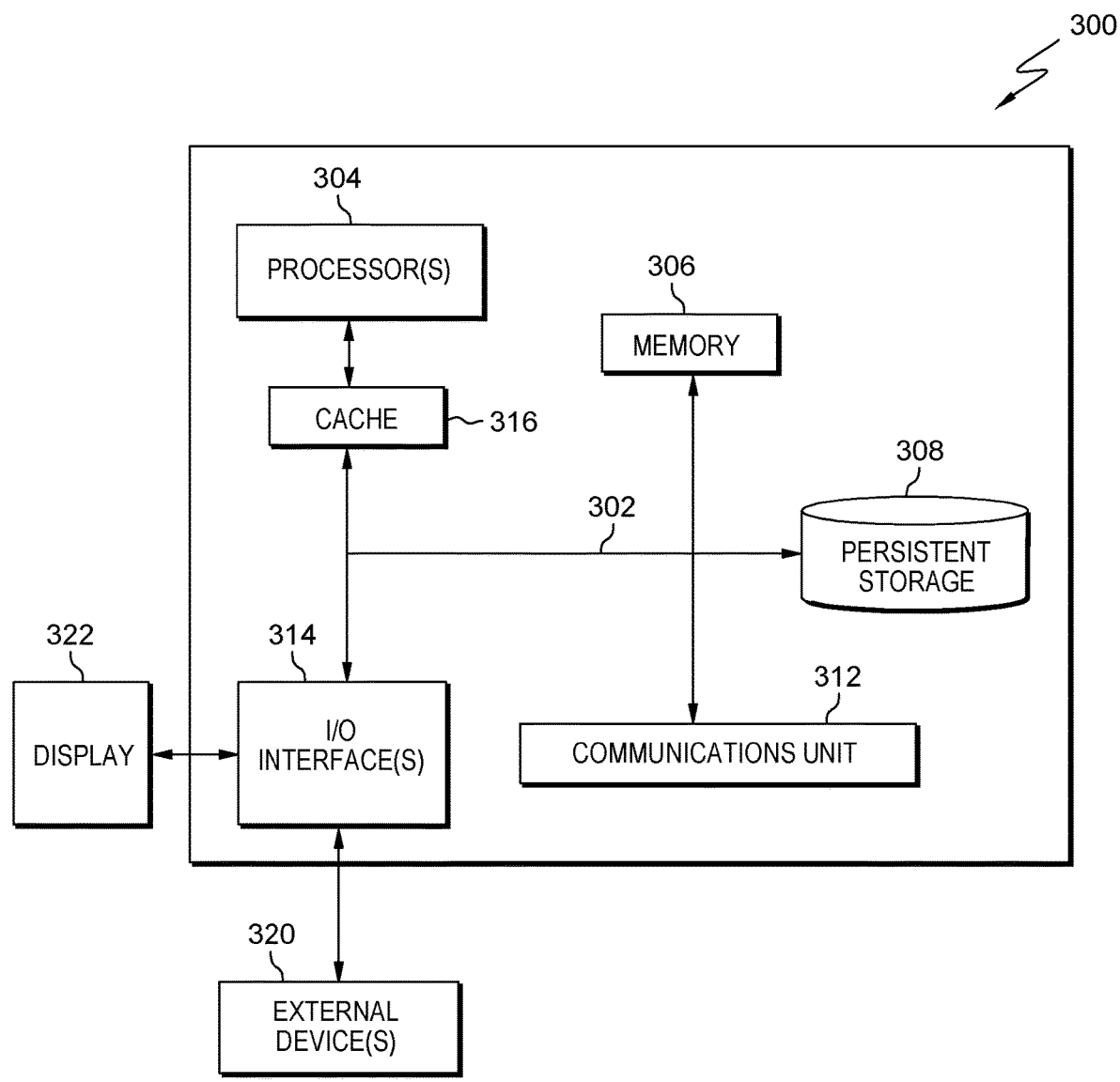
FIG. 3 depicts a block diagram of components of computing systems within a computing display environment of FIG. 1, in accordance with an embodiment of the present invention.

FIG. 3 depicts a block diagram of components of computing systems within a computing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 300 includes a communications fabric 302, which provides communications between a cache 316, a memory 306, a persistent storage 308, a communications unit 312, and an input/output (I/O) interface(s) 314. The communications fabric 302 can be implemented with any architecture designed for passing data and/or control information between processors (such as microprocessors, communications and network processors, etc.), system memory, peripheral devices, and any other hardware components within a system. For example, the communications fabric 302 can be implemented with one or more buses or a crossbar switch.

The memory 306 and the persistent storage 308 are computer readable storage media. In this embodiment, the memory 306 includes random access memory (RAM). In general, the memory 306 can include any suitable volatile or non-volatile computer readable storage media. The cache 316 is a fast memory that enhances the performance of the computer processor(s) 304 by holding recently accessed data, and data near accessed data, from the memory 306.

The program 104 may be stored in the persistent storage 308 and in the memory 306 for execution by one or more of the respective computer processors 304 via the cache 316. In an embodiment, the persistent storage 308 includes a magnetic hard disk drive. Alternatively, or in addition to a magnetic hard disk drive, the persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 308 may also be removable. For example, a removable hard drive may be used for the persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 includes one or more network interface cards. The communications unit 312 may provide communications through the use of either or both physical and wireless communications links. The program 104 may be downloaded to the persistent storage 308 through the communications unit 312.

The I/O interface(s) 314 allows for input and output of data with other devices that may be connected to a mobile device, an approval device, and/or the server computing device 108. For example, the I/O interface 314 may provide a connection to external devices 320 such as a keyboard, keypad, a touch screen, and/or some other suitable input device. External devices 320 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 308 via the I/O interface(s) 314. The I/O interface(s) 314 also connect to a display 322.

The display 322 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    identifying at least one user in a plurality of users using a plurality of indicative markers;
    dynamically analyzing input data stored on a computing device associated with the identified user;
    generating an automated personalized walkthrough by tailoring a plurality of steps within the input data to the at least one identified user; and
    in response to generating the automated personalized walkthrough, generating an automated personalized tutorial by aggregating the generated walkthrough and the at least one identified user based on a predetermined threshold of assessment.

2. The computer-implemented method of claim 1, wherein identifying the at least one user comprises retrieving a data profile associated with the identified user, wherein the data profile details an assessment value associated with user.

3. The computer-implemented method of claim 1, wherein dynamically analyzing the input data comprises:
    receiving instructions to install a new application or update a previously installed application;
    determining an existence of the input data stored on the computing device; and
    retrieving the determined input data associated with the installation of the application or the update of the previously installed application.

4. The computer-implemented of claim 1 further comprising dynamically analyzing the input data by:
    identifying each step of a retrieved walkthrough, wherein the walkthrough is retrieved from an external data source;

predicting a usefulness value of each step based a data profile of the identified user, wherein each step meets or exceeds a predetermined threshold of usefulness; and
removing each step of the retrieved walkthrough that fails to meet the predetermined threshold of usefulness.

5. The computer-implemented method of claim 1, wherein tailoring the generated personalized walkthrough comprises removing at least one step in the plurality of steps associated with the walkthrough that fails to meet the predetermined threshold of usefulness associated with the analyzed walkthrough.

6. The computer-implemented method of claim 1, wherein generating the automated personalized tutorial comprises generating a plurality of tasks associated with the generated personalized walkthrough and a data profile associated with the user, where each task associated with a step is required to be completed prior to a subsequent task associated with a subsequent step becomes available.

7. The computer-implemented method of claim 1, wherein aggregating the generated walkthrough and the identified identity of the user comprises:
performing a query on an external data source for an average assessment value associated with each step within the plurality of steps for the generated walkthrough, wherein the assessment value is based on the average time to complete each step within the plurality of steps;
predicting each step within the plurality of steps that the user meets or exceeds a predetermined threshold of assessment based on the data profile of the user;
prioritizing a sequence of predicted steps within the generated walkthrough that were not removed, wherein the prioritization provides additional resources for the steps within the plurality of steps that are determined to be a higher prioritization than the steps within the plurality of steps that are determined to have a lower prioritization; and
dynamically generating the automated personalized tutorial based on the prioritized steps in the plurality of steps associated with the generated walkthrough.

8. The computer-implemented method of claim 1, wherein input data stored on a computing device associated with the identified user is used to estimate differences between a functional model of a system and a user model.

9. The computer-implemented method of claim 8, further comprising:
reconciling estimated differences between the functional model of the system and the user model using a respective, generated automated personalized walkthrough.

10. A computer program product comprising:
one or more computer readable storage media and program instructions stored on the one or more computer readable storage media, the program instructions comprising:
program instructions to identify least one user in a plurality of users using a plurality of indicative markers;
dynamically analyzing input data stored on a computing device associated with the identified user;
generating an automated personalized walkthrough by tailoring the plurality of steps within the input data to the at least one identified user; and
in response to generating the automated personalized walkthrough, generating an tutorial by aggregating the generated walkthrough and the at least one identified user based on a predetermined threshold of assessment.

11. The computer program product of claim 10, wherein the program instructions to identify the at least one user comprise program instructions to retrieve a data profile associated with the identified user, wherein the data profile details an assessment value associated with user.

12. The computer program product of claim 10, wherein the program instructions to dynamically analyze the input data comprise:
program instructions to receive instructions to install a new application or update a previously installed application;
program instructions to determine an existence of the input data stored on the computing device; and
program instructions to retrieve the determined input data associated with the installation of the application or the update of the previously installed application.

13. The computer program product of claim 10, wherein the program instructions stored on the one or more computer readable storage media further comprise program instructions to dynamically analyze the input data by:
program instructions to identify each step of a retrieved walkthrough, wherein the walkthrough is retrieved from an external data source;
program instructions to predict a usefulness value of each step based a data profile of the identified user, wherein each step meets or exceeds a predetermined threshold of usefulness; and
program instructions to remove each step of the retrieved walkthrough that fails to meet the predetermined threshold of usefulness.

14. The computer program product of claim 10, wherein the program instructions to tailor the generated personalized walkthrough comprise program instructions to remove at least one step in the plurality of steps associated with the walkthrough that fails to meet the predetermined threshold of usefulness associated with the analyzed walkthrough.

15. The computer program product of claim 8, wherein the program instructions to generate the automated personalized tutorial comprise program instructions to generate a plurality of tasks associated with the generated personalized walkthrough and a data profile associated with the user, where each task associated with a step is required to be completed prior to a subsequent task associated with a subsequent step becomes available.

16. The computer program product of claim 10, wherein the program instructions to aggregate the generated walkthrough and the identified identity of the user comprise:
program instructions to perform a query on an external data source for an average assessment value associated with each step within the plurality of steps for the generated walkthrough, wherein the assessment value is based on the average time to complete each step within the plurality of steps;
program instructions to predict each step within the plurality of steps that the user meets or exceeds a predetermined threshold of assessment based on the data profile of the user;
program instructions to prioritize a sequence of predicted steps within the generated walkthrough that were not removed, wherein the prioritization provides additional resources for the steps within the plurality of steps that are determined to be a higher prioritization than the steps within the plurality of steps that are determined to have a lower prioritization; and program instructions to dynamically generate the automated personalized tutorial based on the prioritized steps in the plurality of steps associated with the generated walkthrough.

17. A computer system comprising:
one or more computer processors;
one or more computer readable storage media; and
program instructions stored on the one or more computer readable storage media for execution by at least one of the one or more processors, the program instructions comprising:
    program instructions to identify least one user in a plurality of users using a plurality of indicative markers;
    dynamically analyzing input data stored on a computing device associated with the identified user;
    generating an automated personalized walkthrough by tailoring the plurality of steps within the input data to the at least one identified user; and
    in response to generating the automated personalized walkthrough, generating an tutorial by aggregating the generated walkthrough and the at least one identified user based on a predetermined threshold of assessment.

18. The computer system of claim 17, wherein the program instructions to identify the at least one user comprise program instructions to retrieve a data profile associated with the identified user, wherein the data profile details an assessment value associated with user.

19. The computer system of claim 17, wherein the program instructions to dynamically analyze the input data comprise:
    program instructions to receive instructions to install a new application or update a previously installed application;
    program instructions to determine an existence of the input data stored on the computing device; and
    program instructions to retrieve the determined the input data associated with the installation of the application or the update of the previously installed application.

20. The computer system of claim 17, wherein the program instructions stored on the one or more computer readable storage media further comprise program instructions to dynamically analyze the input data by:
    program instructions to identify each step of a retrieved walkthrough, wherein the walkthrough is retrieved from an external data source;
    program instructions to predict a usefulness value of each step based a data profile of the identified user, wherein each step meets or exceeds a predetermined threshold of usefulness; and
    program instructions to remove each step of the retrieved walkthrough that fails to meet the predetermined threshold of usefulness.

\* \* \* \* \*